(12) United States Patent
Amano

(10) Patent No.: US 8,967,820 B2
(45) Date of Patent: Mar. 3, 2015

(54) POINTER STRUCTURE

(71) Applicant: Yazaki Corporation, Tokyo (JP)

(72) Inventor: Mikiya Amano, Shimada (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 14/088,871

(22) Filed: Nov. 25, 2013

(65) Prior Publication Data

US 2014/0146515 A1 May 29, 2014

(30) Foreign Application Priority Data

Nov. 26, 2012 (JP) ................................. 2012-257942

(51) Int. Cl.
G01D 11/28 (2006.01)
B60K 35/00 (2006.01)
G01D 13/26 (2006.01)

(52) U.S. Cl.
CPC ............. B60K 35/00 (2013.01); G01D 13/265 (2013.01)
USPC ...................................... 362/23.21; 362/558

(58) Field of Classification Search
USPC ..................... 362/558, 23.21, 630, 631, 632
See application file for complete search history.

(56) References Cited

U.S. PATENT DOCUMENTS

| 8,472,119 B1* | 6/2013 | Kelly ............................. 359/630 |
| 2005/0109261 A1 | 5/2005 | Tanaka et al. |
| 2012/0014127 A1* | 1/2012 | Kanade et al. ................ 362/558 |

FOREIGN PATENT DOCUMENTS

JP 2005-181301 A 7/2005

* cited by examiner

*Primary Examiner* — Tracie Y Green
(74) *Attorney, Agent, or Firm* — Sughrue Mion, PLLC

(57) ABSTRACT

A pointer structure including: a pointer main body formed by a light guide member and having a light guide portion closer to a light source and a light guide portion closer to a visualizing portion that are continued together through a pointer bend portion; an outer reflection surface formed at an outer corner of the pointer bend portion so that a ray of light from a light source can be incident thereon; and an inner reflection surface formed at an inner corner of the pointer bend portion and having a normal line thereof intersecting with a normal line of the outer reflection surface, the normal line of the inner reflection surface intersecting with the normal line of the outer reflection surface at an including angle θ, on a light input side, smaller than 180 degrees and greater than 90 degrees.

2 Claims, 6 Drawing Sheets

POINTER STRUCTURE

CROSS REFERENCE TO RELATED APPLICATIONS

This application is based on and claims the benefit of Japanese Patent Application No. 2012-257942 filed on Nov. 26, 2012, the contents of which are incorporated herein by reference in its entirety.

BACKGROUND OF THE INVENTION

1. Technical Field

The present invention relates to a pointer structure.

2. Description of the Related Art

There is a known vehicular pointer device having a display, such as a liquid-crystal display (LCD), arranged in a center of a dial plate for a rotary pointer. In the case such a display is disposed frontward of a dial plate for the ordinary rotary pointer, the display can be laid out at or around a center of the dial plate without interfering a view of the display with the pointer.

However, in the case where the dial plate is to indicate important information such as vehicle speed and the display is to show comparatively less significant information such as current time or so, the dial plate is desirably disposed frontward of the display in a manner improving the visibility of the dial plate.

In the pointer device in a type as shown in FIGS. 5A and 5B, an LCD 610 is provided backward of the dial plate 600 formed thereon with an indicator showing, for example, vehicle speeds so that the LCD 610 backward is exposed through an aperture 601 formed in a center of the dial plate 600. Furthermore, the pointer device includes a pointer 620 for pointing an indicator on the dial plate 600, a circuit board 630 carrying electronic components thereon, and an internal mechanism 640 mounted on the circuit board 630 to rotate the pointer 620 (see Patent Document 1, for example).

The pointer 620 is provided extending along from the internal mechanism 640 to the back and main surfaces of the dial plate 600 through, in order, a backside of the LCD 610, an outer periphery of the LCD 610 and a gap between the LCD 610 and the dial plate 600. Namely, the pointer 620 is in a generally S-shape that is folded through between the dial plate 600 and the LCD 610. With this structure, the pointer 620 is not obstructive to a view of the LCD 610 despite the LCD 610 is disposed backward of the dial plate 600.

In the meanwhile, the pointer 620 is desired to emit light spontaneously in order to improve its visibility. In this case, it can be contemplated that, for example, a plurality of LED light sources are provided on the circuit board 630 in a manner surrounding a rotation shaft of the internal mechanism 640 and, moreover, the pointer 620 is formed from a light guide member as its pointer main body so that the light received from the light sources closer to the internal mechanism 640 can be guided to a pointer visualizing portion closer to a tip of the pointer main body. Further, a pointer bend portion of the pointer main body used in such a spontaneous light pointer device is provided with a reflection surface for internal reflection.

FIGS. 6A and 6B are essential-part side views showing a reference example of a spontaneous light pointer in which reflection surfaces are provided respectively at pointer bend portions of a pointer main body.

A pointer main body 501 shown in FIG. 6A is formed in a generally S-form as mentioned before and has a plurality of pointer bend portions 503a-503d. For example, the pointer bend portion 503a closer to a pointer base end, i.e. closest to a light source, is provided between a light guide portion 505 closer to a light source and a light guide portion 507 closer to a visualizing portion, as shown in FIG. 6B. The pointer bend portion 503a has at its outer corner an outer reflection surface 511 formed inclining at approximately 45 degrees so that a ray of light from the light source can be incident thereon. In addition, the pointer bend portion 503a has at its inner corner an inner reflection surface 513 formed parallel with the outer reflection surface 511. Accordingly, the outer reflection surface 511 has a normal line 515 given parallel with a normal line 517 of the inner reflection surface 513. Thus, a linear ray of light 509 emitted from a light source and traveling parallel with an axis X of the light guide portion 505 enters the outer reflection surface 511 and reflects thereon, and then becomes a reflection ray of light 521 propagating to the light guide portion 507 closer to the visualizing portion.

PRIOR ART DOCUMENT

Patent Document

Patent Document 1: JP-2005-181301A

SUMMARY OF THE INVENTION

Problem that the Invention is to Solve

However, the pointer structure in the reference example shown in FIGS. 6A and 6B involves a problem that an oblique ray of light 523 traveling from the light source through the light guide portion 505 closer to the light source is liable to leak outside of the pointer main body 501 because the outer reflection surface 511 and the inner reflection surface 513 are formed parallel with each other in the pointer bend portion 503a.

Namely, if the oblique ray of light 523 propagating through the light guide portion 505 enters the outer reflection surface 511 and reflects thereon at an angle equal to an incidence angle thereof with the normal line 515, and then becomes a first reflection ray of light 525 entering the inner reflection surface 513. The first reflection ray of light 525 incident upon the inner reflection surface 513 reflects at an angle equal to an incidence angle thereof with the normal line 517, and then becomes a second reflection ray of light 527 propagating through the light guide portion 507 closer to the visualizing portion. Here, if the outer reflection surface 511 and the inner reflection surface 513 are assumed to be parallel with each other, the second reflection ray of light 527 entering a boundary surface 529 of the pointer main body 501 is so small in incidence angle relative to the boundary surface 529 and that is liable to leak outside the pointer main body 501 instead of going into total reflection. As a result, there is a possibility that sufficient brightness for pointer illumination is not obtained due to light loss, in the pointer structure having the parallel outer and inner reflection surfaces 511, 513 at the pointer bending portion 503a.

The present invention has been made in view of the above circumstances and aims at providing a pointer structure that is improved in light utilization efficiency with reducing light loss at a pointer bend portion of a pointer main body.

Means for Solving the Problem

According to one aspect of the invention, there is provided a pointer structure comprising: a pointer main body formed from a light guide member and having a light guide portion closer to a light source and a light guide portion closer to a visualizing portion that are continued together through a pointer bend portion; an outer reflection surface formed at an outer corner of the pointer bend portion so that a ray of light from a light source can be incident thereon; and an inner reflection surface formed at an inner corner of the pointer bend portion, the inner reflection surface having a normal line thereof intersecting with a normal line of the outer reflection surface at an including angle, on a light input side, smaller than 180 degrees and greater than 90 degrees.

According to the pointer structure configured as described above, an oblique ray of light emitted from a light source and propagating through the light guide portion closer to the light source enters an outer reflection surface formed at an outer corner of the pointer bend portion and reflects thereon at a reflection angle equal to an incidence angle thereof with a normal line of the outer reflection surface, and then becomes a first reflection ray of light entering the inner reflection surface. The first reflection ray of light entered the inner reflection surface formed at an inner corner of the pointer bend portion reflects thereon at a reflection angle equal to an incidence angle thereof with a normal line of the inner reflection surface, and then becomes a second reflection ray of light propagating to the light guide portion closer to the visualizing portion. Here, concerning the inner reflection surface, the normal line thereof inclines toward a direction of light propagation relatively to the normal line of the outer reflection surface. Accordingly, the second reflection ray of light enters a boundary surface of the pointer main body at an incidence angle greater than that in a structure whose outer and inner reflection surfaces are provided parallel with each other and readily goes into total reflection at the boundary surface. Thus, light loss can be reduced by decreasing the possibility of leak, to an outside of the pointer main body, such a second reflection ray of light resulting from a oblique ray of light traveling through the light guide portion closer to a light source.

The pointer main body may have the pointer bend portions in plurality of number, at least a closest one out of the pointer bend portions having the outer reflection surface and the inner reflection surface.

According to the pointer structure configured as described above, in the case where a plurality of pointer bend portions are present, the ray of light emitted from the light source and entering the pointer main body has a light intensity lowered as passing through a greater number of pointer bend portions due to light loss. For this reason, light loss can be reduced with high improvement efficiency by reducing the light loss in an intense ray of light at the pointer bend portion closest to the light source.

According to the present invention, a pointer structure improved in light utilization efficiency can be provided by reducing light loss at a pointer bend portion of a pointer main body.

The present invention was briefly explained above. The details of the present invention will be further clarified by thoroughly reading Mode for Carrying Out the Invention (hereinafter, referred to as "embodiment") explained below with reference to the accompanying drawings.

MODE FOR CARRYING OUT THE INVENTION

Hereinafter, an embodiment according to the present invention will be explained with reference to the drawings.

Figure 1:
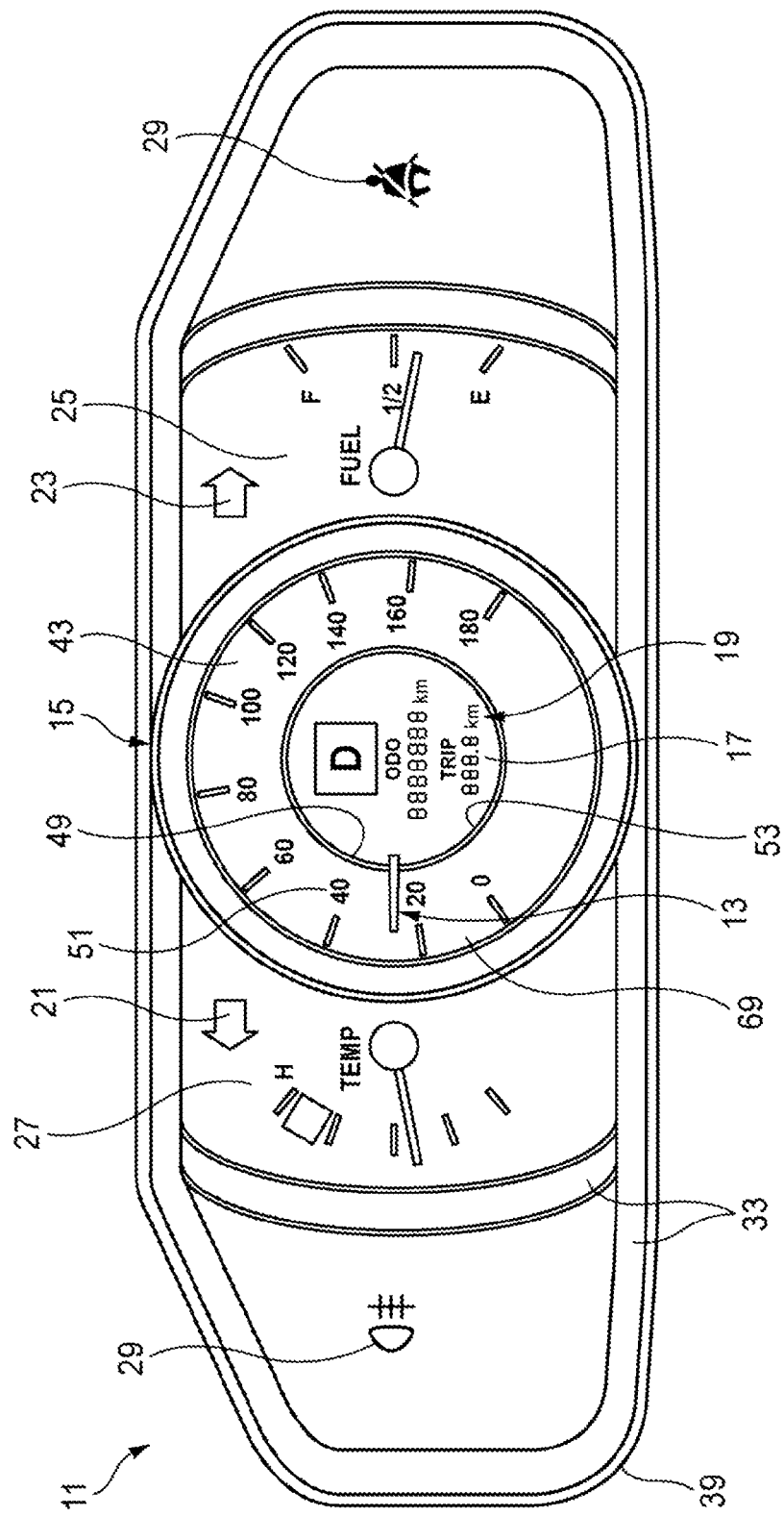
FIG. 1 is a front view of a combination meter provided with a spontaneous light pointer having a pointer structure according to one embodiment of the present invention.

As shown in FIG. 1, a pointer structure in the present embodiment is to be suitably used for a spontaneous light pointer 13 of a combination meter 11. The combination meter 11 is mounted for example in an instrument panel, not shown, of a vehicle. The combination meter 11 is arranged with a speedometer 15 for indicating a speed of a vehicle, a multi-display 19 using an LCD 17 as a display, a turn L indicator 21, a turn R indicator 23, a fuel indicator 25 for indicating a remaining amount of fuel, a water temperature indicator 27 for indicating a water temperature, and a warning light 29 for giving warning of not fastening of a seat belt or of forgetting to turn off lights.

Figure 2:
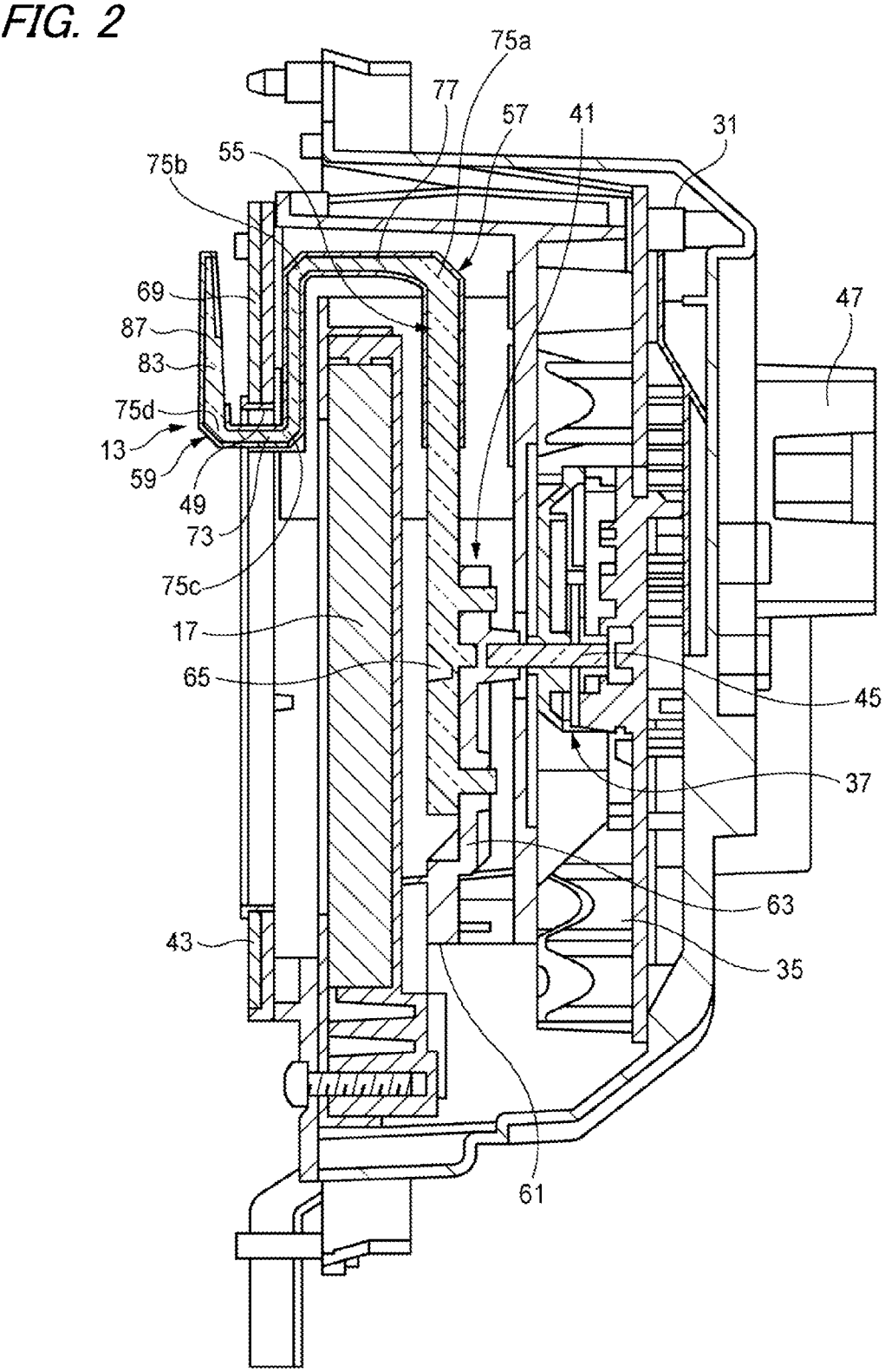
FIG. 2 is a vertical sectional view of the combination meter shown in FIG. 1.

As shown in FIG. 2, the speedometer 15, the multi-display 19, the turn L indicator 21, the turn R indicator 23, the fuel indicator 25, the water temperature indicator 27 and the warning light 29 are housed in a casing 31 of the combination meter 11. The casing 31 is attached with an inside cover 33 (see FIG. 1) at a front face thereof so that the inside cover 33 conceals those housed in the casing 31 such as a circuit board 35 and a drive section 37. A cover glass 39 is attached at a front of the casing 31.

The speedometer 15 is equipped with a spontaneous light pointer device 41. The spontaneous light pointer device 41 includes a spontaneous light pointer 13, a dial plate 43, a drive section 37 disposed behind the LCD 17, a rotating shaft 45 arranged to be rotated by the drive section 37, a circuit board 35 on which the drive section 37 is mounted, and a connector 47 for external connection of the circuit board 35 to a wire harness of a vehicle body. The dial plate 43 is formed in a doughnut form (a circular ring form) in front view having centrally a generally circular aperture 49, in which a speed scale 51 is formed along an outer periphery thereof. The LCD 17 is arranged in back of the dial plate 43 so that it can be seen from front through the aperture 49 of the dial plate 43. Namely, the LCD 17 assumes a form that is surrounded by an inner edge 53 of the dial plate 43.

Figure 3:
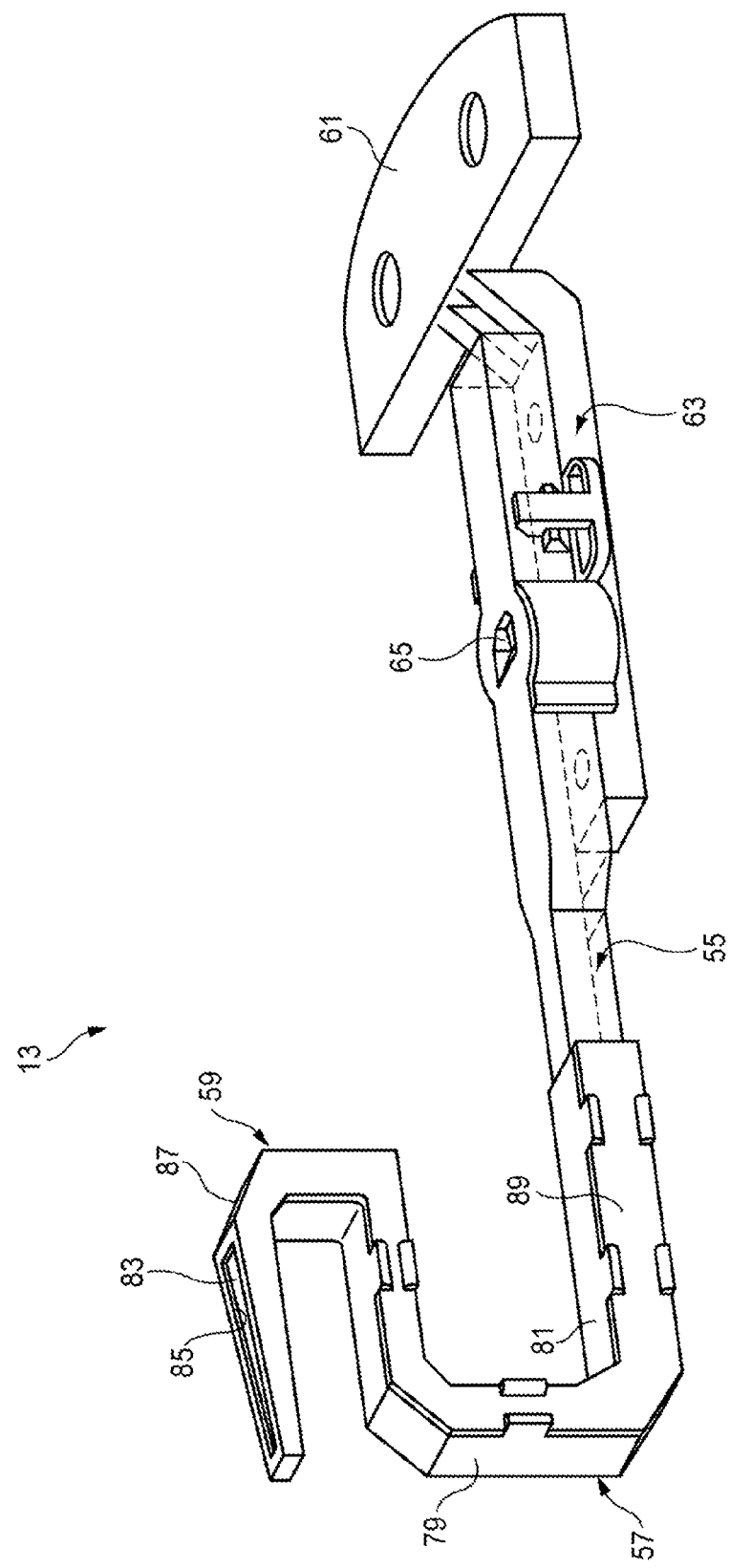
FIG. 3 is an overall perspective view of a spontaneous light pointer shown in FIG. 2.

The spontaneous light pointer 13 having a pointer structure according to the present embodiment includes a pointer main body 55, a main cover 57, a sub-cover 59 and a support 63 having a counterbalance 61, as shown in FIG. 3. The pointer main body 55 is formed with a light inlet 65 in a position closer to a base end thereof. The pointer main body 55 is formed of a transparent resin material as a light guide member capable of inputting light from a light source, not shown, and propagating it through an interior thereof. The resin material is not limitative but can employ PMMA (polymethylmethacrylate), PC (polycarbonate), PS (polystyrene), COP (cyclic olefin polymer) or the like, in respect of light transmissivity and formability. The main cover 57 and the sub-cover 59 are each formed of a light-shielding material or with a light-shielding film so that light can be blocked from exiting toward a main surface of the dial plate 43 through regions except for the window 85 referred later.

Figure 4A:
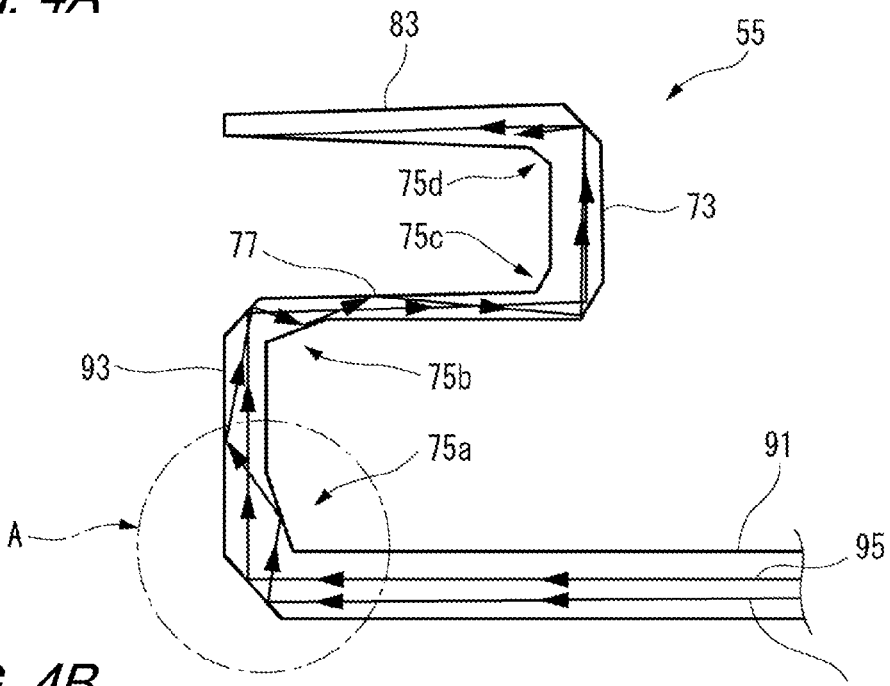
FIG. 4A is an essential-part side view of the pointer main body shown in FIG. 3

The pointer main body 55 in the present embodiment has at a tip a pointer visualizing portion 83 arranged extending along a main surface 69 of the dial plate 43. As shown in FIG. 4A, the pointer main body 55 has a pointer neck portion 73 continuing to the pointer visualizing portion 83 through a pointer bend portion 75*d* and extending along from an inner edge 53 of the dial plate 43 to a backside of the dial plate 43. By connecting the pointer neck portion 73 with a U-shaped bend portion 77 further having three pointer bend portions 75*a*-75*c* in a position closer to the pointer base end, the pointer main body 55 is formed in a generally S-shape closer to the tip thereof. This permits the pointer visualizing portion 83 to point the speed scale 51 on the dial plate 43 arranged frontward of the LCD 17 with design improvement, despite the drive section 37 lies in back of the LCD 17.

The main cover 57 is formed in a trough form sandwiching the pointer main body 55 in a region closer to the pointer base end than the pointer neck portion 73, by a first sidewall 79 and a second sidewall 81 continuing therefrom into confrontation through a bottom wall (not shown). As shown in FIG. 3, the main cover 57 is fitted to the pointer main body 55 only in its S-shaped region closer to the tip thereof.

The sub-cover 59 has an L-shaped cover portion 87 formed with a window 85 through which the pointer visualizing portion 83 is exposed and covering both side faces of the pointer visualizing portion 83, an outer corner of the pointer bend portion 75*d* and both side faces of the pointer neck portion 73. An L-shaped cover sidewall covering one of the neck side faces continues with a lid portion 89 closing an opening spanning between the first sidewall 79 and the second sidewall 81.

The lid portion 89 closing the opening is secured to the opening through a claw-engagement structure provided between the first and second sidewalls 79, 81 and the lid portion 89.

Next, the pointer bend portions 75*a*-75*d* will be described which characterize the pointer main body 55 according to the present embodiment. Incidentally, because the pointer bend portions 75*a*-75*d* are generally similar in configuration to each other, the pointer bend portion 75*a* will be described as an example while referring to FIG. 4.

Figure 4B:
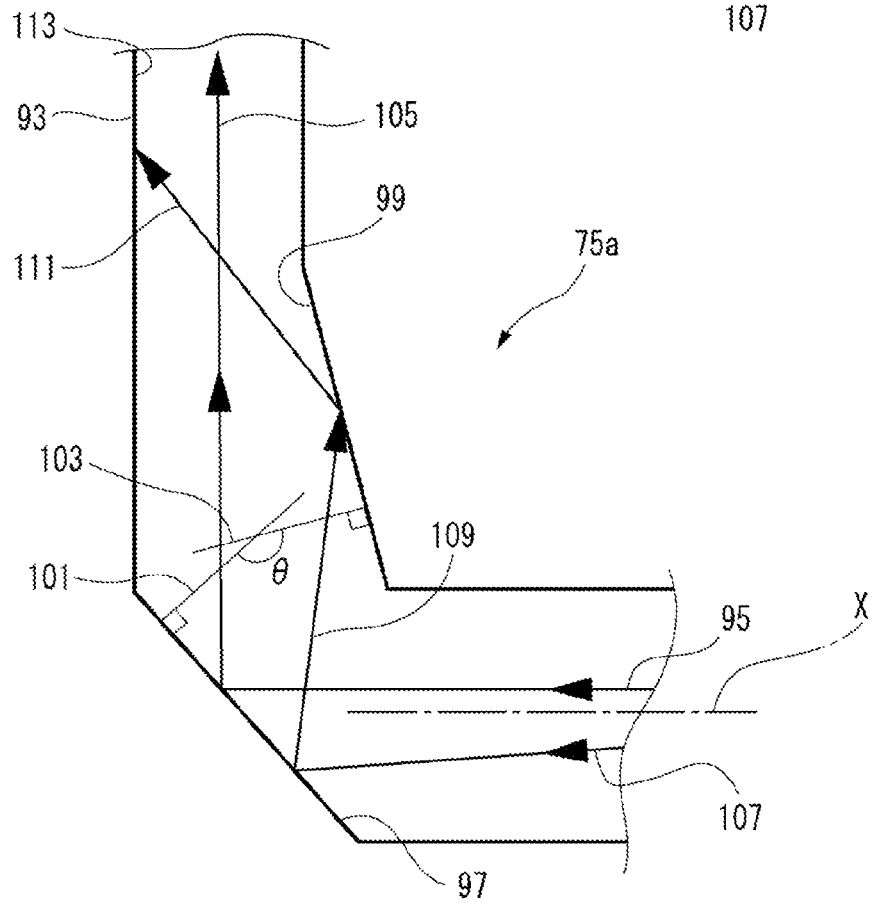
FIG. 4B is an enlarged view of part A of FIG. 4A.
Figure 5A:
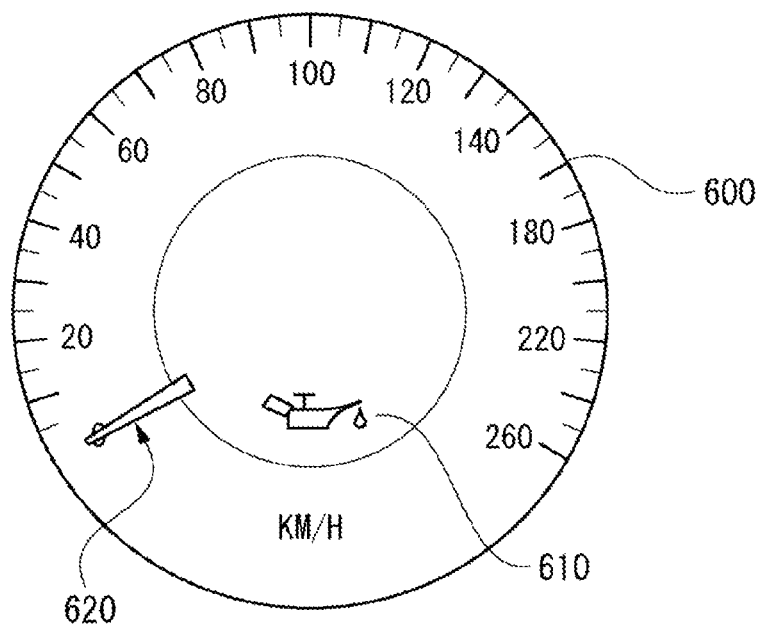
FIG. 5A is a front view showing one example of a conventional pointer device and FIG. 5B is a fragmentary sectional view of the pointer device shown in FIG. 5A.
Figure 5B:
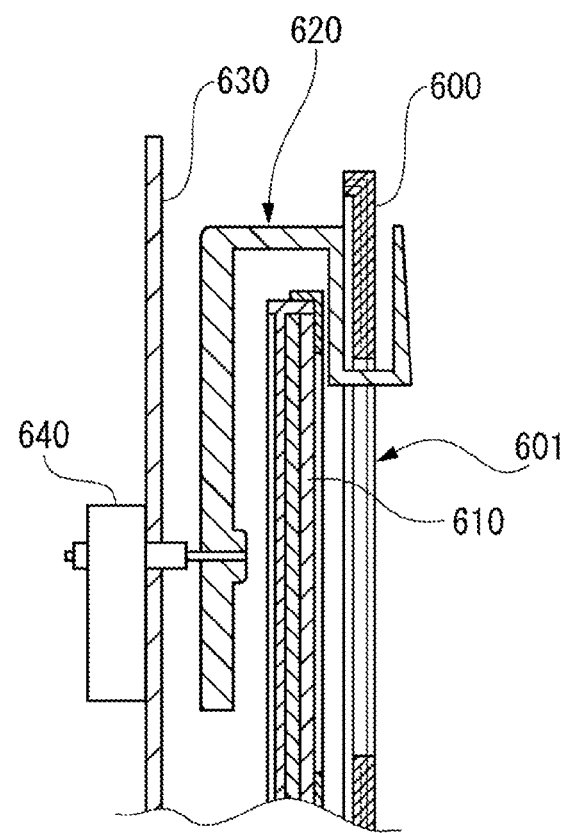
Figure 6A:
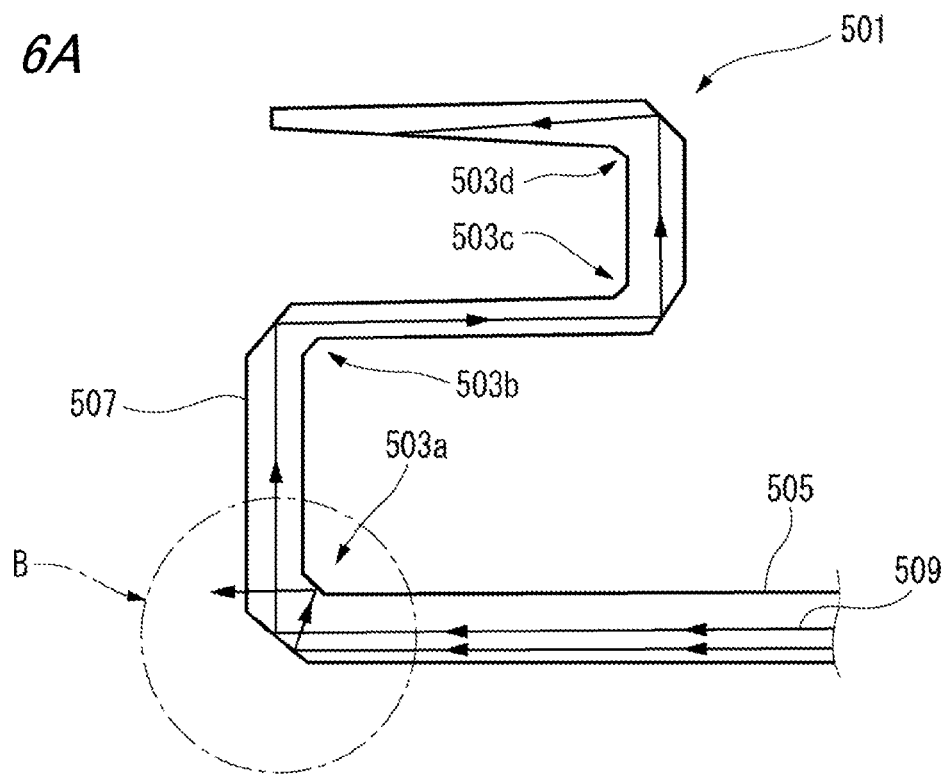
FIG. 6A is an essential-part side view showing a reference example of a pointer main body and FIG. 6B is an enlarged view of part B of FIG. 6A.
Figure 6B:
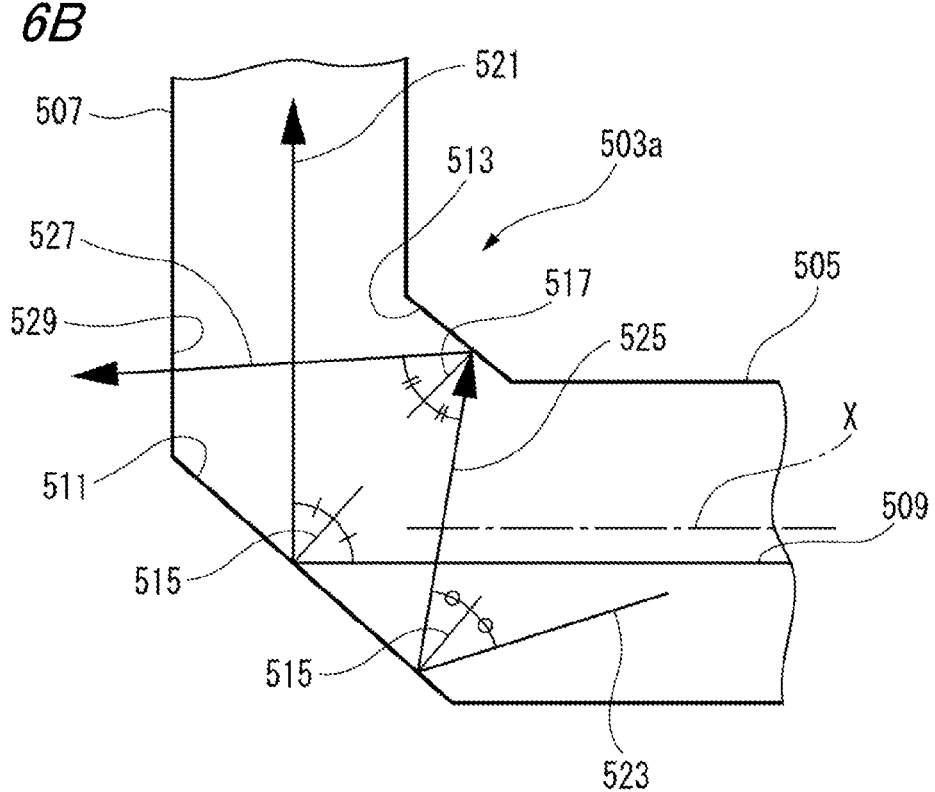

The pointer bend portion 75*a* in the pointer main body 55 connects between a light guide portion 91 provided closer to a light source and a light guide portion 93 provided closer to the visualizing portion, as shown in FIG. 4. The pointer bend portion 75*a* has an outer corner forming an outer reflection surface 97 on which rays of light (a linear ray of light 95 and an oblique ray of light 107) from a light source are to be incident. In an inner corner of the pointer bend portion 75*a*, an inner reflection surface 99 is formed opposite to the outer reflection surface 97 so that a first reflection ray of light 109 from the outer reflection surface 97 can be incident thereon. The inner reflection surface 99 has a normal line 103 intersecting with a normal line 101 of the outer reflection surface 97 and is formed as an inclined surface that the normal line 103 of the inner reflection surface intersects with the normal line 101 of the outer reflection surface at an including angle θ, on a light input side, smaller than 180 degrees and greater than 90 degrees.

More preferably, the inner reflection surface 99 is formed as an inclined surface that its normal line 103 intersects with the normal line 101 of the outer reflection surface at an including angle θ, on a light input side, smaller than 180 degrees and greater than 135 degrees. This is because not to decrease the cross-sectional area of light guide at the pointer bend portion 75*a*.

Although the pointer main body 55 in this embodiment has pointer bend portions 75*a*-75*c* plurality in the number, the pointer bend portions 75*a*-75*c* each may have an outer reflection surface 97 and an inner reflection surface 99, or at least the pointer bend portion 75*a*, located closest to the light source, may have an outer reflection surface 97 and an inner reflection surface 99.

Next, the function of the pointer structure configured as above will be described.

In the pointer structure in the present embodiment, a linear ray of light 95 emitted from the light source and traveling parallel with an axis X of the light guide portion 91 closer to the light source enters the outer reflection surface 97 formed at an outer corner of the pointer bend portion 75*a* and reflects there at a reflection angle equal to the incidence angle thereof with the normal line 101 of the outer reflection surface, and then becomes a reflection ray of light 105 propagating to the light guide portion 93 closer to the visualizing portion.

An oblique ray of light 107 emitted from the light source and propagating through the light guide portion 91 closer to the light source enters the outer reflection surface 97 and reflects there at a reflection angle equal to the incidence angle thereof with the normal line 101 of the outer reflection surface, and then becomes a first reflection ray of light 109 entering the inner reflection surface 99. The first reflection ray of light 109 entered the inner reflection surface 99 formed at an inner corner of the pointer bend portion 75*a* reflects there at a reflection angle equal to the incidence angle thereof with the normal line 103, and then becomes a second reflection ray of light 111 propagating to the light guide portion 93 closer to the visualizing portion.

Here, concerning the inner reflection surface 99, its normal line 103 inclines toward a direction of light propagation relatively to the normal line 101 of the outer reflection surface. Accordingly, the second reflection ray of light 111 is incident on a boundary surface 113 of the pointer main body 55 at a greater angle as compared to that in a structure whose outer reflection surface 97 and inner reflection surface 99 are in parallel with each other and hence is ready to go into total reflection upon the boundary surface 113. Thus, the second reflection ray of light 111, resulting from an oblique ray of light 107 passed through the light guide portion 91 closer to the light source, is less to leak outside the pointer main body 55 so that light loss can be reduced.

In the pointer structure in this embodiment, in the case where a plurality of pointer bend portions 75*a*-75*d* are present, the ray of light emitted from the light source and entered the pointer main body 55 is lowered in light intensity as the number of pointer bend portions 75*a*-75*d* passed through is greater. For this reason, if outer and inner reflection surfaces 97, 99 are provided at least at the pointer bend portion 75*a* closest to the light source, light loss can be reduced with high improvement efficiency by reducing the loss in the light intense greater at the pointer bend portion 75*a* provided closest to the light source.

Therefore, according to the present embodiment, a pointer structure is provided which is improved in light utilization efficiency by reducing light loss at the pointer bend portion 75*a* of the pointer main body 55.

Incidentally, the present invention is not limited to the above embodiment but can be modified, improved or so appropriately. Besides, the components in the embodiment are arbitrary and not limitative in respect of their materials, shapes, dimensions, number, arrangement points or the like as long as the present invention can be achieved.

For example, the pointer main body 55 of the spontaneous light pointer 13 in the present embodiment has a pointer neck portion 73 continuing with the pointer visualizing portion 83 through a pointer bend portion 75d and extending along from an inner edge 53 of the dial plate 43 to a backside of the dial plate 43. By continuing the pointer neck portion 73 with a U-shaped bend portion 77 closer to the pointer base end, a generally S-shape is given in a region closer to the tip of the pointer main body having four pointer bend portions 75a-75d. However, the pointer structure according to the present invention is not limited to the above. Namely, a pointer main body can be configured with a generally J-shape at its tip and two pointer bend portions, by providing a pointer neck portion continuing with a pointer visualizing portion through a pointer bend portion and extending along from an outer edge of a dial plate to a backside of the dial plate and by continuing a straight extension portion from the pointer neck portion closer to the base end.

What is claimed is:

1. A pointer structure comprising:
a pointer main body formed from a light guide member and having a first light guide portion closer to a light source and a second light guide portion closer to a visualizing portion that are continued together through a pointer bend portion;
an outer reflection surface formed at an outer corner of the pointer bend portion so that a ray of light from the light source can be incident thereon; and
an inner reflection surface formed at an inner corner of the pointer bend portion, the inner reflection surface having a normal line thereof intersecting with a normal line of the outer reflection surface at an including angle, on a light input side, smaller than 180 degrees and greater than 90 degrees.

2. A pointer structure according to claim 1, wherein the pointer main body includes a plurality of pointer bend portions, at least a closest one out of the pointer bend portions having the outer reflection surface and the inner reflection surface.

* * * * *